(12) United States Patent
Chapman et al.

(10) Patent No.: US 10,832,380 B2
(45) Date of Patent: Nov. 10, 2020

(54) SYSTEMS AND METHODS FOR CORRECTING COLOR FOR UNCALIBRATED MATERIALS

(71) Applicant: Disney Enterprises, Inc., Burbank, CA (US)

(72) Inventors: Steven Chapman, Burbank, CA (US); Mehul Patel, Burbank, CA (US); Joseph Popp, Burbank, CA (US); Ty Popko, Burbank, CA (US); Erika Doggett, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 323 days.

(21) Appl. No.: 15/997,564

(22) Filed: Jun. 4, 2018

(65) Prior Publication Data
US 2019/0370939 A1 Dec. 5, 2019

(51) Int. Cl.
*G06K 9/00* (2006.01)
*G06T 5/00* (2006.01)
*G06T 7/90* (2017.01)

(52) U.S. Cl.
CPC ............. *G06T 5/001* (2013.01); *G06T 7/90* (2017.01); *G06T 2207/10024* (2013.01); *G06T 2207/20172* (2013.01)

(58) Field of Classification Search
CPC .......... G06T 5/003; G06T 5/20; G06T 5/002; G06T 5/001; G06T 3/4053; H04N 1/60; H04N 9/69; H04N 9/73; H04N 9/735
USPC ....... 382/167, 254, 275, 128, 255, 274, 282, 382/280, 264, 162; 348/14.08, 208.4, 348/575, 208.1, 208.12, 345, 352, 208.6,
(Continued)

(56) References Cited

U.S. PATENT DOCUMENTS

| 5,212,546 A | 5/1993 | Arazi et al. |
| 6,985,253 B2 | 1/2006 | Figueroa et al. |
| 7,068,838 B2 | 6/2006 | Manbeck et al. |

(Continued)

OTHER PUBLICATIONS

NoFilmSchool, "EPICOLOR Uses Artificial Intelligence to Grade Your Footage Automatically," Oct. 14, 2017, <https://nofilmschool.com/2017/10/epicolor-ai-color-grading-plugin>.

(Continued)

*Primary Examiner* — Charlotte M Baker
(74) *Attorney, Agent, or Firm* — Dorsey & Whitney LLP

(57) ABSTRACT

Systems and methods for correcting color of uncalibrated material is disclosed. Example embodiments include a system to correct color of uncalibrated material. The system may include a non-transitory computer-readable medium operatively coupled to processors. The non-transitory computer-readable medium may store instructions that, when executed cause the processors to perform a number of operations. One operation is to obtain a target image of a degraded target material with one or more objects. The degraded target material comprises degraded colors and light information corresponding to light sources in the degraded target material. Another operations is to obtain color reference data. Another operation is to identify an object in the target image that corresponds to the color reference data. Yet another operation is to correct the identified object in the target image. Another operation is to correct the target image.

21 Claims, 6 Drawing Sheets
(3 of 6 Drawing Sheet(s) Filed in Color)

(58) Field of Classification Search
USPC ............. 348/208.99, 607; 715/810; 345/690, 345/589, 590, 600, 605; 358/3.26, 3.27
See application file for complete search history.

(56) References Cited

U.S. PATENT DOCUMENTS

| | | |
|---|---|---|
| 7,079,682 B2 | 7/2006 | Niesen |
| 8,803,984 B2* | 8/2014 | Ishii ....................... G06T 5/003 |
| | | 348/208.4 |
| 8,976,264 B2 | 3/2015 | Rivard et al. |
| 9,002,109 B2 | 4/2015 | Krishnaswamy et al. |
| 9,691,161 B1 | 6/2017 | Yalniz et al. |
| 9,754,163 B2 | 9/2017 | Segalovitz et al. |
| 2014/0079286 A1* | 3/2014 | Lee ....................... G06K 9/6202 |
| | | 382/103 |
| 2014/0313303 A1 | 10/2014 | Davis et al. |
| 2016/0224861 A1 | 8/2016 | Vogh et al. |
| 2017/0161569 A1 | 6/2017 | Ren et al. |

OTHER PUBLICATIONS

De Polo et al., "Digital Picture Restoration and Enhancement for Quality Archiving," 14th International Conference on Digital Signal Processing, Jul. 31, 2002.

\* cited by examiner

SYSTEMS AND METHODS FOR CORRECTING COLOR FOR UNCALIBRATED MATERIALS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Materials containing images, such as film, degrade over time. As the materials degrade, the colors on the images may degrade at varying rates. For example, what was originally royal blue used across a material may no longer be the same color on a first portion of the material as a second portion of the material. Moreover, the colors of the material may not have been calibrated to a given color map, making color corrections more difficult on a global scale.

SUMMARY

Embodiments of the present disclosure include systems, methods, and devices capable of correcting color of uncalibrated images of degraded target material, as well as interconnected processors and/or circuitry, to correct uncalibrated images, including in some examples, by using light information and color reference data.

In accordance with aspects of the present disclosure, a system for correcting color of uncalibrated material. The system includes a non-transitory computer-readable medium operatively coupled to processors. The non-transitory computer-readable medium stores instructions that, when executed cause the processors to perform a number of operations. One such operation is to obtain a target image of a degraded target material with one or more objects. The degraded target material includes degraded colors and light information corresponding to light sources in the degraded target material. Another such operation is to obtain color reference data. Yet another such operation is to identify at least one of the one or more objects in the target image that correspond to the color reference data. Another such operation is to correct the one or more identified objects in the target image based on the color reference data and the light information. Yet another such operation is to correct the target image based on the one or more corrected objects.

In embodiments, the color reference data is selected from a group including real-life objects, paint formulations corresponding to a given era when the degraded target material was captured, ink processes corresponding to the given era when the degraded target material was captured, museum-conserved records, and color matching records.

In embodiments, identifying the at least one of the one or more objects in the target image includes using object recognition.

In embodiments, the object recognition weights shapes and patterns of the at least one of the one or more objects more heavily than colors of the at least one of the one or more objects.

In embodiments, correcting the target image based on the one or more corrected objects includes weighting a position of the one or more corrected objects to correct the target image.

In embodiments, another operation is to generate an index of degradation based on how the one or more corrected objects are corrected.

In embodiments, the target image based on the one or more corrected objects includes averaging the index of degradation for the one or more corrected objects. The target image based on the one or more corrected objects includes correcting the target image based on an average of the index of degradation for the one or more corrected objects.

In accordance with additional aspects of the present disclosure, a method for correcting color of uncalibrated material includes a number of operations. The method includes obtaining a target image of a degraded target material with one or more objects. The degraded target material includes degraded colors and light information corresponding to light sources in the degraded target material. The method includes obtaining color reference data. The method includes identifying at least one of the one or more objects in the target image that correspond to the color reference data. The method includes correcting the one or more identified objects in the target image based on the color reference data and the light information. The method includes correcting the target image based on the one or more corrected objects.

In embodiments, the color reference data is selected from a group including real-life objects, paint formulations corresponding to a given era when the degraded target material was captured, ink processes corresponding to the given era when the degraded target material was captured, museum-conserved records, and color matching records.

In embodiments, identifying the at least one of the one or more objects in the target image includes using object recognition.

In embodiments, the object recognition weights shapes and patterns of the at least one of the one or more objects more heavily than colors of the at least one of the one or more objects.

In embodiments, correcting the target image based on the one or more corrected objects includes weighting a position of the one or more corrected objects to correct the target image.

In embodiments, the method further includes generating an index of degradation based on how the one or more corrected objects are corrected.

In embodiments, correcting the target image based on the one or more corrected objects includes averaging the index of degradation for the one or more corrected objects. Correcting the target image based on the one or more corrected objects includes correcting the target image based on an average of the index of degradation for the one or more corrected objects.

In accordance with additional aspects of the present disclosure, a server system for correcting color of uncalibrated material. The system includes a non-transitory computer-readable medium operatively coupled to processors. The non-transitory computer-readable medium stores instructions that, when executed cause the processors to perform a number of operations. One such operation is to obtain a target image of a degraded target material with objects. The degraded target material includes light information corresponding to light sources in the degraded target material and degraded colors. Another such operation is to obtain color reference data. Yet another such operation is to identify at least one of the one or more objects in the target image that correspond to the color reference data. Another such operation is to correct the one or more identified objects in the target image based on the color reference data and the light information. Yet another such operation is to correct the target image based on the one or more corrected objects.

In embodiments, identifying the at least one of the one or more objects in the target image includes using object recognition.

In embodiments, the object recognition weights shapes and patterns of the at least one of the one or more objects more heavily than colors of the at least one of the one or more objects.

In embodiments, correcting the target image based on the one or more corrected objects includes weighting a position of the one or more corrected objects to correct the target image.

In embodiments, another operation is to generate an index of degradation based on how the one or more corrected objects are corrected.

In embodiments, correcting the target image based on the one or more corrected objects includes averaging the index of degradation for the one or more corrected objects. Correcting the target image based on the one or more corrected objects includes correcting the target image based on an average of the index of degradation for the one or more corrected objects.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Color correction to uncalibrated images have previously been based on assuming a certain color is a given value and correcting the rest of the image based on that assumed value. For example, assuming a white color in an image is a pure white (e.g., red, green, blue (RGB): 255, 255, 255). Therefore, the other colors would be shifted based on the assumption the white color is a pure white. This assumption is a subjective one, where people will differ on what is pure white. However, the current technology uses actual objects in a scene to inform the remainder of the image; therefore, an objective methodology is presented to color correct uncalibrated images.

Embodiments of the present disclosure are directed to systems, methods, and devices for correcting color of uncalibrated images of degraded target material. In various deployments described herein, the degraded target material may include degraded colors. The degraded target material may also include one or more objects with degraded colors. Light information may be determined based on the degraded target material. At least one of the one or more objects may be identified as corresponding to color reference data. The light information and the color reference data may be used to correct the one or more identified objects. The one or more corrected objects may be used to correct the remainder of the image.

Figure 1:
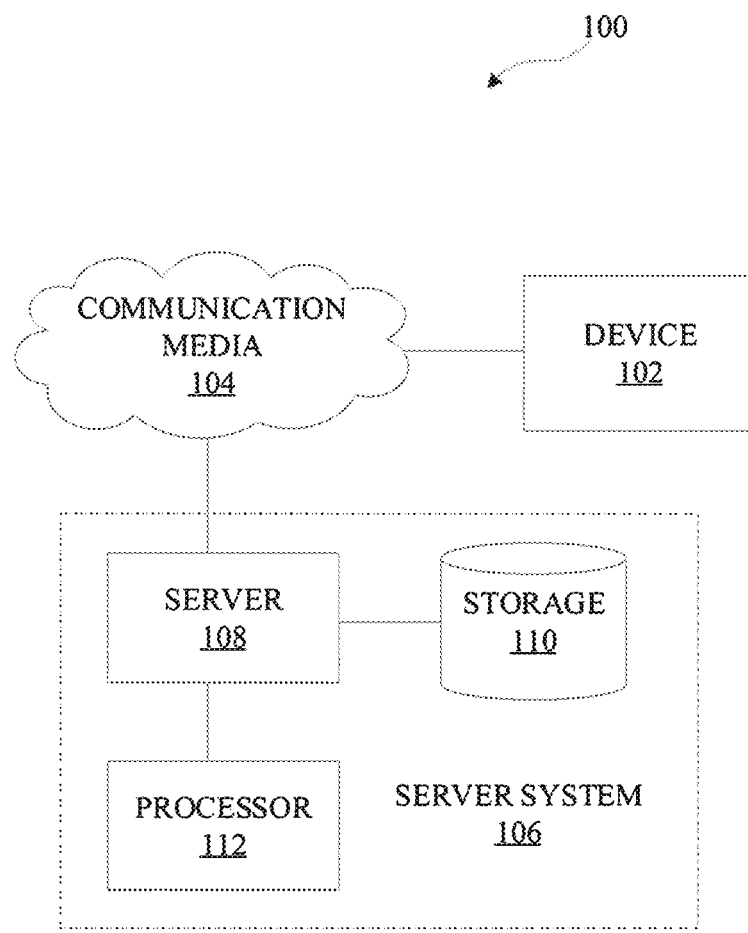
FIG. 1 illustrates an example environment in which embodiments of the disclosure may be implemented.

Before describing the technology in detail, it is useful to describe an example environment in which the presently disclosed technology can be implemented. FIG. 1 illustrates one such example environment 100.

Environment 100 may be used in connection with implementing embodiments of the disclosed systems, methods, and devices. By way of example, the various below-described components of FIG. 1 may be used to correct color in a target image of a degraded target material based on color reference data, light information, capture information, and objects in the degraded target material. The degraded target material may be film, photos, canvas, paper, and/or other material. The degraded target material may have corresponding light information and capture information. The light information may include information about direct and indirect light sources in the degraded target material, how objects interact with light (e.g., reflectivity of surfaces), light temperature, and/or other information. Light information may be determined using various techniques, such as ray tracing. A person of ordinary skill in the art will recognize that other techniques may be used to determine the light information. For example, color reference data may include the bidirectional reflectance distribution function (BRDF) of a given object, which would help in recreating how the light rays interact with the given object. Based on a given position of a light source, the light rays directed into a given device at a given moment of capture may be determined based on the known BRDF of a given object. Similarly, other color reference data may be used in conjunction with the light information to correct the target image. For example, even though a real-life object is pure red (e.g., RGB 255, 0, 0), the light information may affect how the color is presented to the camera via brightness, light temperature, indirect light sources, etc. As a result, the original accurate color on the degraded target material may have been a darker red with some green and blue (e.g., RGB 230, 50, 50).

The degraded target material may have one or more objects in the target material, and the degraded target material and the one or more objects may have degraded colors. At least one of the one or more objects may correspond to color reference data. Color reference data may include real-life objects corresponding to the objects, color references (e.g., Pantone® swatches), typical ink and paint formulations from a corresponding era when the degraded target material was captured, color records, and/or other material. Color reference data may be stored in storage 110.

Device 102 may capture the degraded target material and the objects to determine color reference data and generate digital copies of the degraded target material and the objects. Device 102 may be camera(s), scanner(s), a gonioreflectometer, and/or other devices. The camera(s) and scanner(s) may be able to create digital copies of the degraded target material to prevent further degradation as a result of the physical environment. As a person of ordinary skill in the art will recognize, other devices may be used to create digital copies of the degraded target material.

The gonioreflectometer may be able to measure a BRDF of a real-life object. The BRDF defines how light is reflected at a surface. The BRDF is a function of four variables that takes an incoming light direction and an outgoing light direction and returns the ratio of reflected radiance from the outgoing light direction and the irradiance from the incoming light direction. The incoming and outgoing light directions are further parameterized by an azimuth angle and a zenith angle.

Using the gonioreflectometer and camera(s), color reference data may be determined based on the BRDF for real-life objects corresponding to at least one of the one or more objects in the degraded target material. Color reference data may also include color information, such as hue, tint, shade, tone, amount of light, source of light, surface properties, and/or other information. Hue may be a pure color. Hue and color may be used interchangeably herein. Tint may be the amount of white added to a hue. Shade may be the amount of black added to a hue. Tone may be the amount of grey added to a hue. Surface properties may include how surface reflects light (specular reflection, diffuse reflection, or absorbing light). The color information may be mapped to color models, such as RGB; Cyan, Magenta, Yellow, Black (CMYK); Hue, Saturation, Value (HSV); Hue, Saturation, Lightness (HSL); Hue, Saturation, Brightness (HSB); Lab Color, Greyscale, and/or other color models.

In some embodiments, capture information corresponding to the material may be used in correcting the target image. For example, a camera used to capture an image on film may have characteristics at the time of capture, such as focal length, film speed, the shutter speed, the field of view, the f-stop, vignetting, dodging, burning, and/or other information. The capture information may be used to more accurately correct target image based on how the degraded target material was captured using a given device.

In some embodiments, device 102 may send the color reference data and images to server system 106 via communication media 104. In other embodiments, color reference data and images may be stored in storage 110.

Server system 106 may obtain images of degraded target material, light information, capture information, color reference data, and/or other information. The images may not be calibrated to determine an accurate original color of the degraded target material. As described herein, one or more objects may be in a given image. At least one of the one or more objects may be identified as corresponding to color reference data. In embodiments, the one or more identified objects may be identified by server system 106 through object recognition that uses machine learning. In embodiments, the object recognition may be trained based on objects that correspond to given color reference data. For example, multiple pictures of objects with corresponding color reference data may be used to train the object recognition algorithm. In some embodiments, the object recognition may be based more on shape and pattern of the one or more objects identified as corresponding to given color reference data than color. Object recognition may include scale-invariant feature transform (SIFT), speeded-up robust feature (SURF), principle component analysis (PCA), and/or other approaches.

In embodiments, the degraded target material may have degraded at varying rates. For example, a blue color in the top right of the degraded target material may have degraded at a first rate, and the same blue color in the bottom right of the target may have degraded at a second rate, wherein the first rate and the second rate are different rates. In another example, a red color in the bottom left may have degraded at a third rate, and a yellow color in the top left may have degraded at a fourth rate, wherein the third rate and the fourth rate are different rates. Similarly, the one or more objects in the degraded target material may have degraded at varying rates. A person of ordinary skill in the art will recognize other ways the degraded target material may degrade at varying rates.

For images with one or more objects identified as corresponding to color reference data, light information and capture information corresponding to the degraded target material and color reference data corresponding to the one or more identified objects are used to correct the one or more identified objects. In some embodiments, the light information, capture information, and color reference data may be used to correct the remainder of the image based on the changes to the object. In some embodiments, a first correction applied to a first object in a bottom right corner may also be applied to the remainder of the bottom right corner, and a second correction applied to a second object in a top right corner may also be applied to the remainder of the top right corner, wherein the first correction and second correction are different.

In embodiments, an index of degradation may be generated based on the corrections to at least one of the one or more corrected objects. The index of degradation may also be determined for the corrected objects based on how the objects are corrected, the type of changes to the color of the one or more corrected objects, the amount of changes to the color of the one or more corrected objects, and/or other factors. In embodiments, the index of degradation for a given pixel, a group of given pixels, or a given corrected object may be determined. In some embodiments, an average of the indices of degradation for all of the one or more corrected objects may be determined and applied to the remainder of the image. In other embodiments, a first average of the indices of degradation of the one or more corrected objects in a first portion of the image may be used to correct the remainder of the first portion of the image, and a second average of the indices of degradation of the one or more corrected objects in a second portion of the image may be used to correct the remainder of the second portion of the image. The degree to which the portions between the first portion and the second portion are corrected may be blended, or otherwise adjusted, to prevent abrupt changes to the corrected image. As a person of ordinary skill in the art will recognize, the one or more corrected objects may be weighted according to other methods.

In embodiments, the indices of degradation for multiple images may be used to train a machine learning algorithm to determine how a given set of images should be corrected. The given set of images may correspond to a film reel, target material stored in a similar environment, or other reasons.

As shown in FIG. 1, environment 100 may include one or more of device 102 and server system 106. As will be described in detail herein, device 102 and/or server system 106 may exchange communications signals, including light information, capture information, color reference data, images, and/or other information via communication media 104.

Communication media 104 may be used to connect or communicatively couple device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, one of skill in the art will recognize other ways to implement communication media 104 for communications purposes.

Likewise, though not shown, it will be appreciated that a similar communication medium may be used to connect or communicatively couple server 108, storage 110, and/or processor 112 to one another in addition to other elements of environment 100. In example implementations, communication media 104 may be or include a wired or wireless wide area network (e.g., cellular, fiber, and/or circuit-switched connection, etc.) for device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from device 102, such as, for example, light information, capture information, color reference data, images, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc. from device 102. The analytics engine may include object recognition and machine learning, as described herein. In embodiments, server 108, storage 110, and processor 112 may be implemented as a distributed computing network, a relational database, or the like.

Server 108 may include, for example, an Internet server, a router, a desktop or laptop computer, a smartphone, a tablet, a processor, a module, or the like, and may be implemented in various forms, including, for example, an integrated circuit or collection thereof, a printed circuit board or collection thereof, or in a discrete housing/package/rack or multiple of the same. Server 108 may update information stored on device 102. Server 108 may send/receive information to/from device 102 in real-time or sporadically. Further, server 108 may implement cloud computing capabilities for device 102.

Figure 2:
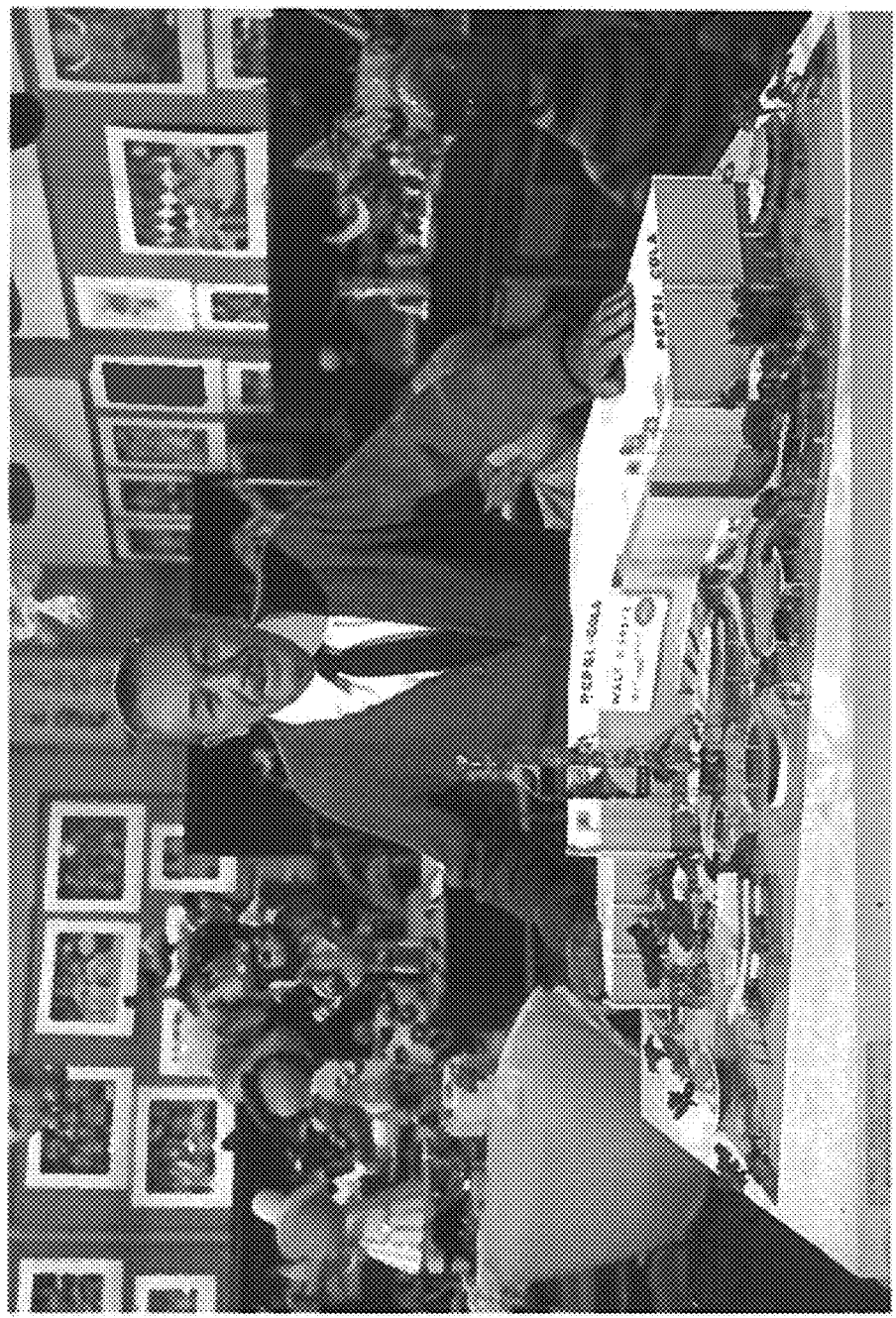
FIG. 2 illustrates an example uncalibrated image with degraded colors, in accordance with embodiments of the disclosure.

FIG. 2 illustrates an example uncalibrated image with degraded colors, in accordance with embodiments of the disclosure. As previously described, uncalibrated image 200 may be of a degraded target material. The degraded target material may have degraded over time resulting in degraded colors. For example, in image 200, the person's face is a purple or red color as a result of degradation. Light information may be obtained from the degraded target material based on how light is directed into the given device and how light reflects off of the various surfaces. One or more objects may be identified via object recognition, as described above, that correspond to color reference data.

Figure 3:
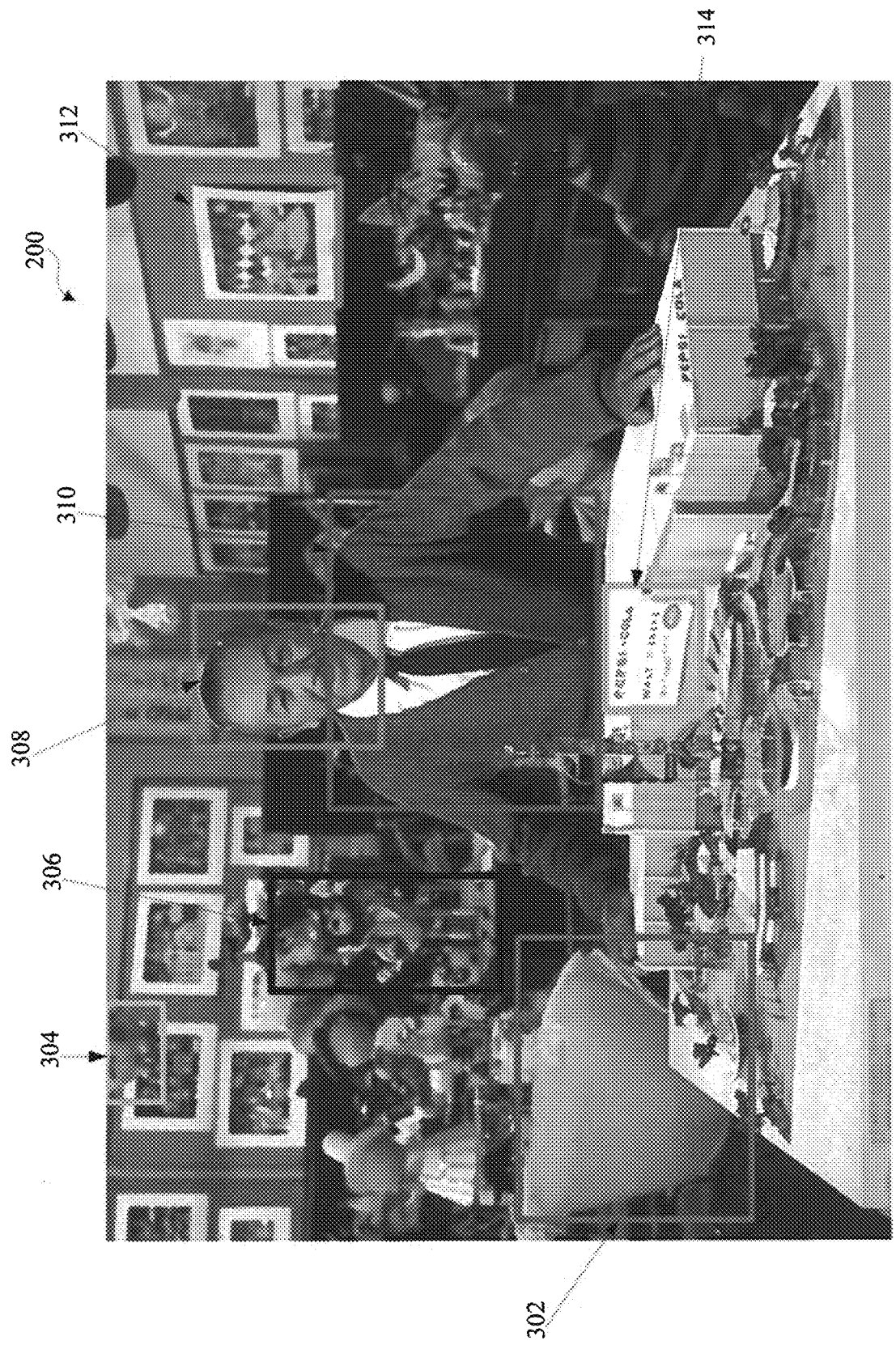
FIG. 3 illustrates an example uncalibrated image with degraded colors and identified objects with corresponding color reference data, in accordance with embodiments of the disclosure.

For example, as illustrated in FIG. 3, uncalibrated image 200 of degraded target material includes identified objects 302, 304, 306, 308, 310, 312, and 314 recognized via object recognition. In some embodiments, the object recognition may use machine-learning to recognize identified objects 302, 304, 306, 308, 310, 312, and 314 corresponding to color reference data in a given image. As described above, the color reference data may be generated using a gonioreflectometer to measure an object's BRDF. The BRDF and the light information may be used to provide accurate corrections of the degraded colors. Other color reference data may be used in conjunction with the light information to accurately correct the image. The machine-learning algorithm may be focused more on shapes and patterns of a given object than on the color of a given object, since using original colors could match objects that are not relevant together. Identified objects 302, 304, 306, 308, 310, 312, and 314 may have been captured using one or more devices 102 and stored in storage 110.

Figure 4:
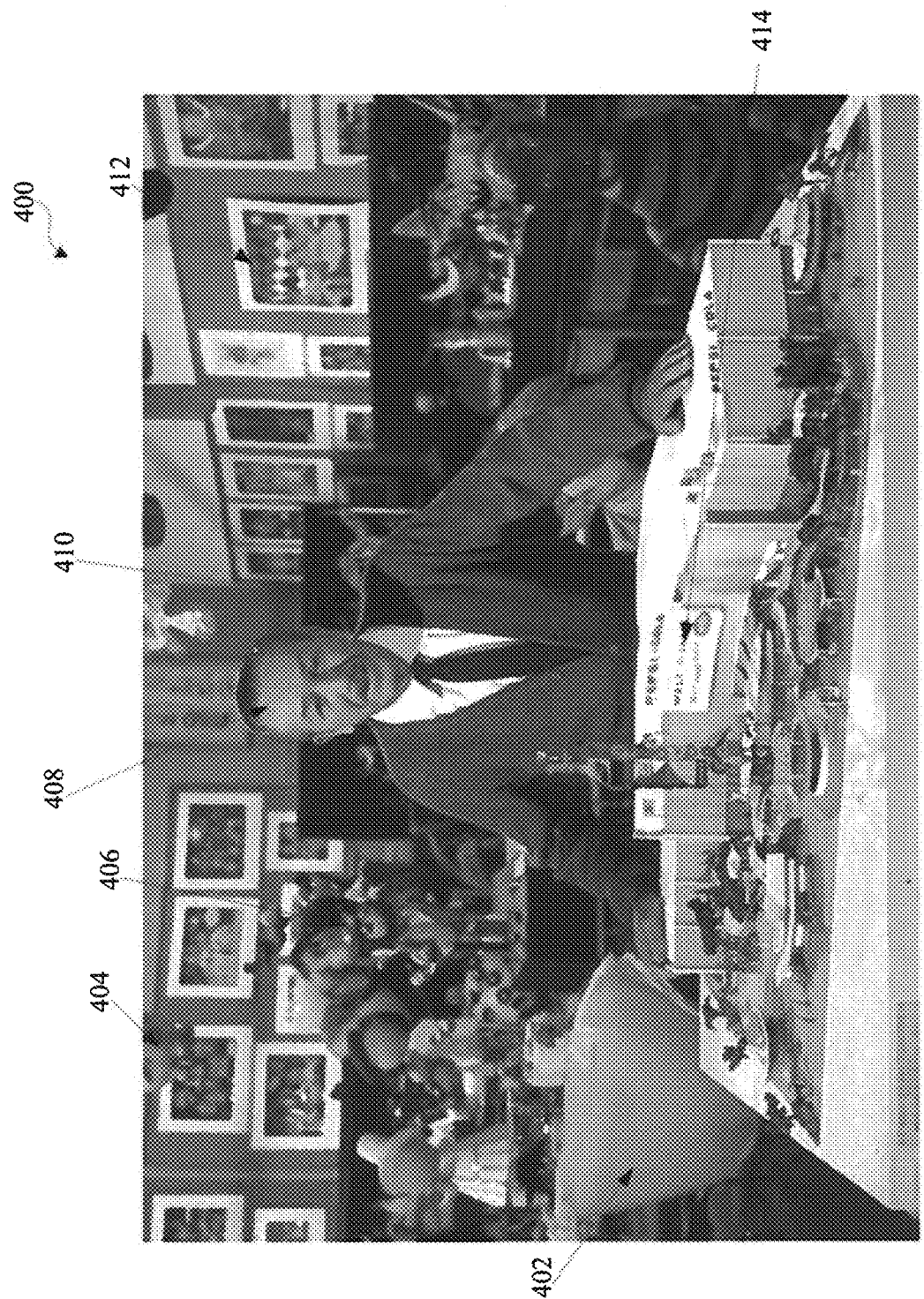
FIG. 4 illustrates an example image with corrected colors, in accordance with embodiments of the disclosure.

FIG. 4 illustrates an example image with corrected colors, in accordance with embodiments of the disclosure. The corrected colors may be based on the corrected objects 402, 404, 406, 408, 410, 412, and 414. As illustrated, the person's face appears more of a beige color, as opposed to the purple or red color in FIGS. 2 and 3.

The index of degradation may be used to correct the remainder of the picture. In one example, a top left corner of image 400 may use part of corrected object 402, corrected object 404, corrected object 406, part of corrected object 408, and part of corrected object 410 to determine how the color is corrected for the remainder of the top left corner of image 400 based on the indices of degradation of the identified corrected objects in the top left corner of image 400. In some embodiments, the correction of the remainder of the image is based on its position relative to a corrected object. A point equidistant between two corrected objects may appropriately blend the two corrections, such that the image does not abruptly change from a first correction to a second correction. In other embodiments, the indices of degradation are averaged and used for the top left corner of image 400. On a less granular level, an average of the indices of degradation of the corrected objects may be applied to the entire image.

Figure 5:
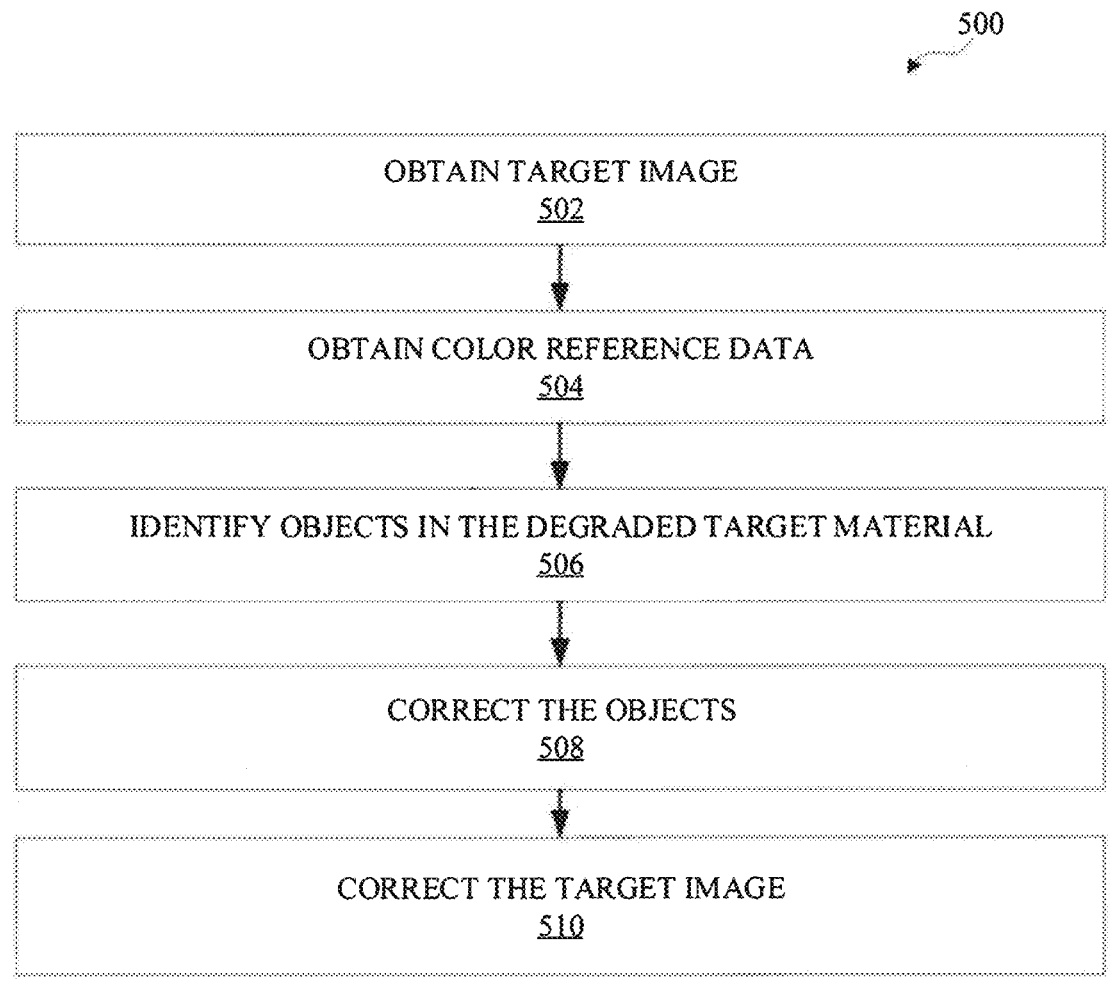
FIG. 5 is an operational flow diagram illustrating various operations that may be performed in accordance with embodiments of the disclosure.

FIG. 5 illustrates a flow diagram depicting various operations of method 500, and accompanying embodiments for correcting color in uncalibrated materials, in accordance with aspects of the present disclosure. The operations of the various methods described herein are not necessarily limited to the order described or shown in the figures, and one of skill in the art will appreciate, upon studying the present disclosure, variations of the order of the operations described herein that are within the spirit and scope of the disclosure.

Figure 6:
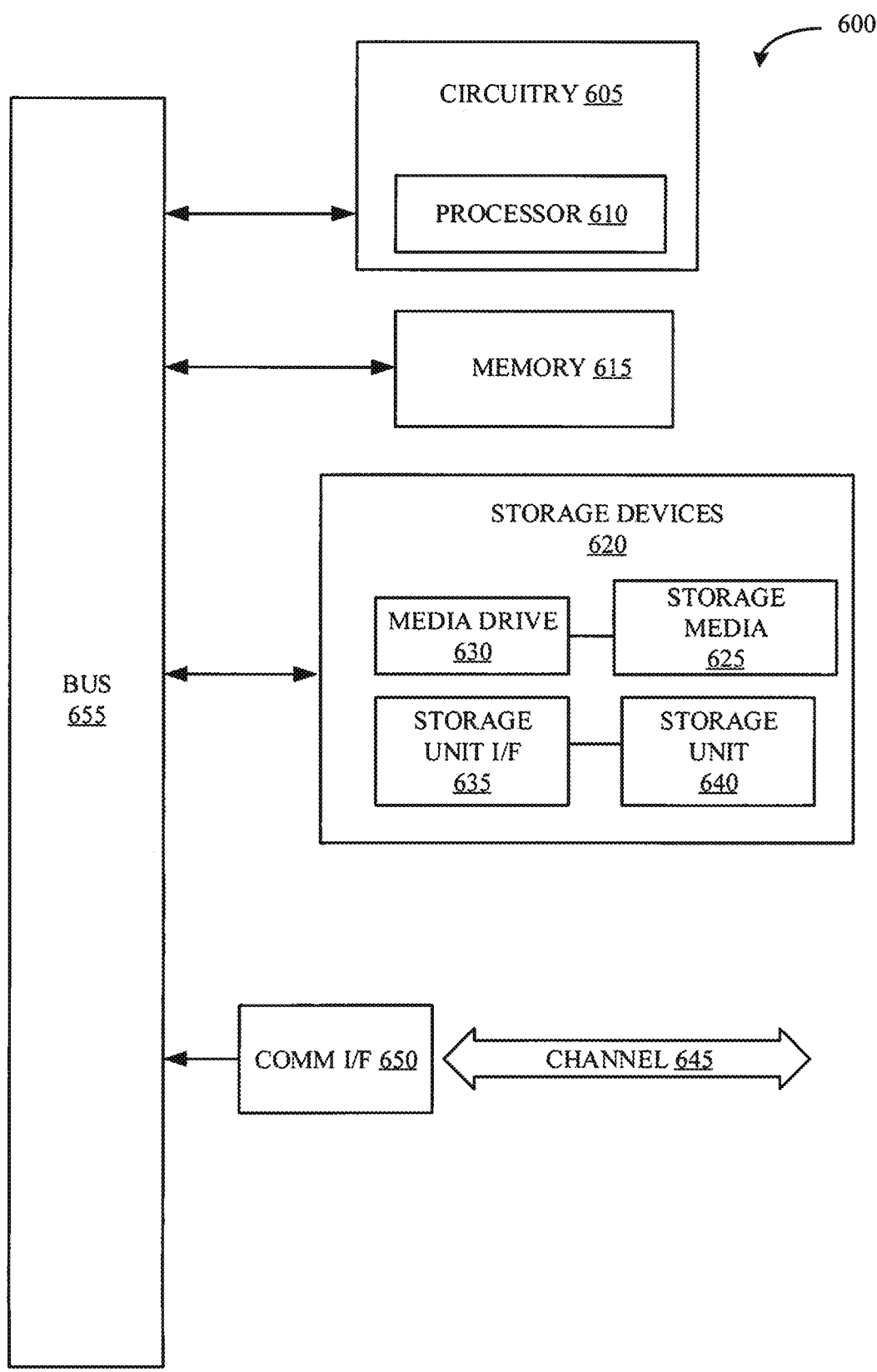
FIG. 6 illustrates an example computing module that may be used to implement features of various embodiments of the disclosure.

The operations and sub-operations of method 500 may be carried out, in some cases, by one or more of the components, elements, devices, modules, and circuitry of environments 100, device 102, communication media 104, server system 106, server 108, processor 112, and/or computing module 600, described herein and referenced with respect to at least FIGS. 1 and 6, as well as sub-components, elements, devices, modules, and circuitry depicted therein and/or described with respect thereto. In such instances, the description of methods 500 may refer to a corresponding component, element, etc., but regardless of whether an explicit reference is made, one of skill in the art will recognize, upon studying the present disclosure, when the corresponding component, element, etc. may be used. Further, it will be appreciated that such references do not necessarily limit the described methods to the particular component, element, etc. referred to. Thus, it will be appreciated by one of skill in the art that aspects and features described above in connection with (sub-) components, elements, devices, modules, circuitry, etc., including variations thereof, may be applied to the various operations described in connection with methods 500 without departing from the scope of the present disclosure.

Referring now to FIG. 5, aspects of method 500 for correcting color for uncalibrated images are depicted. At operation 502, method 500 includes obtaining a target image. Device 102 may be used to capture a target image of degraded target material. The degraded target material may include degraded colors and light information corresponding to light sources in the degraded target material. Light information may be determined from the target image, as described above. The target image may have one or more objects identified as corresponding to color reference data.

At operation 504, method 500 includes obtaining color reference data. Color reference data may include real-life objects used in films, known ink and paint formulations from the era of the original film, color matching reference swatches, paint formulations, ink processes, museum-conserved records, Pantone® color matching records, and/or other data. For example, real-life objects may be captured using a gonioreflectometer that measures the BRDF of the real-life objects. The color reference data may correspond to at least one of the one or more objects in the image.

At operation 506, method 500 includes identifying one or more objects in the degraded target material. The one or more objects identified may have corresponding color reference data. Object recognition may be used to identify the one or more objects. As described above, the object recognition may be trained based on the one or more objects identified as corresponding to the color reference data using machine learning.

At operation 508, method 500 includes correcting the one or more identified objects. The one or more identified objects are corrected based on the color reference data and the light information. This may include techniques similar to ray-tracing, which is disclosed above. The technique may include identifying direct and indirect light sources, specular and diffuse objects, and other relevant light information. Used in conjunction with color reference data, the colors may be corrected for the one or more identified objects.

At operation 510, method 500 includes correcting the target image. Correcting the target image may be based on the one or more corrected objects, as described in more detail above. The corrections may weight the position of a corrected object, the average of the one or more corrected objects, and/or other factors, which may be described herein.

FIG. 6 illustrates example computing module 600, which may in some instances include a processor/controller resident on a computer system (e.g., server system 106 and/or device 102). Computing module 600 may be used to implement various features and/or functionality of embodiments of the systems, devices, and methods disclosed herein. With regard to the above-described embodiments set forth herein in the context of systems, devices, and methods described with reference to FIGS. 1 through 5, including embodiments involving device 102 and/or server system 106, one of skill in the art will appreciate additional variations and details regarding the functionality of these embodiments that may be carried out by computing module 600. In this connection, it will also be appreciated by one of skill in the art upon studying the present disclosure that features and aspects of the various embodiments (e.g., systems) described herein may be implemented with respected to other embodiments (e.g., methods) described herein without departing from the spirit of the disclosure.

As used herein, the term module may describe a given unit of functionality that may be performed in accordance with one or more embodiments of the present application. As used herein, a module may be implemented utilizing any form of hardware, software, or a combination thereof. For example, one or more processors, controllers, ASICs, PLAs, PALs, CPLDs, FPGAs, logical components, software routines, or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand upon studying the present disclosure that these features and functionality may be shared among one or more common software and hardware elements, and such description shall not require or imply that separate hardware or software components are used to implement such features or functionality.

Where components or modules of the application are implemented in whole or in part using software, in embodiments, these software elements may be implemented to operate with a computing or processing module capable of carrying out the functionality described with respect thereto. One such example computing module is shown in FIG. 6. Various embodiments are described in terms of example computing module 600. After reading this description, it will become apparent to a person skilled in the relevant art how to implement example configurations described herein using other computing modules or architectures.

Referring now to FIG. 6, computing module 600 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing module 600 is specifically purposed.

Computing module 600 may include, for example, one or more processors, controllers, control modules, or other processing devices, such as a processor 610, and such as may be included in circuitry 605. Processor 610 may be implemented using a special-purpose processing engine such as, for example, a microprocessor, controller, or other control logic. In the illustrated example, processor 610 is connected to bus 655 by way of circuitry 605, although any communication medium may be used to facilitate interaction with other components of computing module 600 or to communicate externally.

Computing module 600 may also include one or more memory modules, simply referred to herein as main memory 615. For example, random access memory (RAM) or other dynamic memory may be used for storing information and instructions to be executed by processor 610 or circuitry 605. Main memory 615 may also be used for storing temporary variables or other intermediate information during execution of instructions to be executed by processor 610 or circuitry 605. Computing module 600 may likewise include a read only memory (ROM) or other static storage device coupled to bus 655 for storing static information and instructions for processor 610 or circuitry 605.

Computing module 600 may also include one or more various forms of information storage devices 620, which may include, for example, media drive 630 and storage unit interface 635. Media drive 630 may include a drive or other mechanism to support fixed or removable storage media 625. For example, a hard disk drive, a floppy disk drive, a magnetic tape drive, an optical disk drive, a CD or DVD drive (R or RW), or other removable or fixed media drive may be provided. Accordingly, removable storage media 625 may include, for example, a hard disk, a floppy disk, magnetic tape, cartridge, optical disk, a CD or DVD, or other fixed or removable medium that is read by, written to, or accessed by media drive 630. As these examples illustrate, removable storage media 625 may include a computer usable storage medium having stored therein computer software or data.

In alternative embodiments, information storage devices 620 may include other similar instrumentalities for allowing computer programs or other instructions or data to be loaded into computing module 600. Such instrumentalities may include, for example, fixed or removable storage unit 640 and storage unit interface 635. Examples of such removable storage units 640 and storage unit interfaces 635 may include a program cartridge and cartridge interface, a removable memory (for example, a flash memory or other removable memory module) and memory slot, a PCMCIA slot and card, and other fixed or removable storage units 640 and storage unit interfaces 635 that allow software and data to be transferred from removable storage unit 640 to computing module 600.

Computing module 600 may also include a communications interface 650. Communications interface 650 may be used to allow software and data to be transferred between computing module 600 and external devices. Examples of communications interface 650 include a modem or softmodem, a network interface (such as an Ethernet, network interface card, WiMedia, IEEE 602.XX, or other interface), a communications port (such as for example, a USB port, IR port, RS232 port Bluetooth® interface, or other port), or other communications interface. Software and data transferred via communications interface 650 may typically be carried on signals, which may be electronic, electromagnetic (which includes optical) or other signals capable of being exchanged by a given communications interface 650. These signals may be provided to/from communications interface 650 via channel 645. Channel 645 may carry signals and may be implemented using a wired or wireless communication medium. Some non-limiting examples of channel 645 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 615, storage unit interface 635, removable storage media 625, and channel 645. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 600 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," "one or more," or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "process," "processed," "processing," and the like may be used synonymously with "render," "rendered," "rendering," and the like. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A system for correcting color of uncalibrated material, the system comprising:
a non-transitory computer-readable medium operatively coupled to a processor and storing instructions that, when executed cause the processor to:
obtain a target image of a degraded target material with one or more objects, wherein the degraded target material comprises degraded colors and light information corresponding to light sources in the degraded target material;
obtain color reference data;
identify at least one of the one or more objects in the target image that correspond to the color reference data;
correct the one or more identified objects in the target image based on the color reference data and the light information; and
correct the target image based on the one or more corrected objects.

2. The system of claim 1, wherein the color reference data is selected from a group comprising real-life objects, paint formulations corresponding to a given era when the degraded target material was captured, ink processes corresponding to the given era when the degraded target material was captured, museum-conserved records, and color matching records.

3. The system of claim 1, wherein identifying the at least one of the one or more objects in the target image comprises using object recognition.

4. The system of claim 3, wherein the object recognition weights shapes and patterns of the at least one of the one or more objects more heavily than colors of the at least one of the one or more objects.

5. The system of claim 1, wherein correcting the target image based on the one or more corrected objects comprises weighting a position of the one or more corrected objects to correct the target image.

6. The system of claim 1, wherein the non-transitory computer-readable medium further stores instructions that, when executed, cause the circuitry processor to generate an index of degradation based on how the one or more corrected objects are corrected.

7. The system of claim 6, wherein the target image based on the one or more corrected objects comprises:
averaging the index of degradation for the one or more corrected objects; and
correcting the target image based on an average of the index of degradation for the one or more corrected objects.

8. A method for correcting color of uncalibrated material, the method comprising:
obtaining a target image of a degraded target material with one or more objects, wherein the degraded target material comprises degraded colors and light information corresponding to light sources in the degraded target material;
obtaining color reference data;
identifying at least one of the one or more objects in the target image that correspond to the color reference data;
correcting the one or more identified objects in the target image based on the color reference data and the light information; and
correcting the target image based on the one or more corrected objects.

9. The method of claim 8, wherein the color reference data is selected from a group comprising real-life objects, paint formulations corresponding to a given era when the degraded target material was captured, ink processes corresponding to the given era when the degraded target material was captured, museum-conserved records, and color matching records.

10. The method of claim 8, wherein identifying the at least one of the one or more objects in the target image comprises using object recognition.

11. The method of claim 10, wherein the object recognition weights shapes and patterns of the at least one of the one or more objects more heavily than colors of the at least one of the one or more objects.

12. The method of claim 8, wherein correcting the target image based on the one or more corrected objects comprises weighting a position of the one or more corrected objects to correct the target image.

13. The method of claim 8, further comprising generating an index of degradation based on how the one or more corrected objects are corrected.

14. The method of claim 13, wherein correcting the target image based on the one or more corrected objects comprises:
averaging the index of degradation for the one or more corrected objects; and
correcting the target image based on an average of the index of degradation for the one or more corrected objects.

15. A system for correcting color of uncalibrated material, the system comprising:
a non-transitory computer-readable medium operatively coupled to a processor and storing instructions that, when executed cause the processor to:
obtain a target image of a degraded target material with one or more objects having a degraded color;
obtain color reference data;
identify at least one of the one or more objects in the target image that correspond to the color reference data;
correct the degraded color of the one or more identified objects in the target image based on the color reference data; and
correct the target image based on the one or more corrected objects.

16. The system of claim 15, wherein identifying at least one of the one or more objects in the target image comprises using object recognition.

17. The system of claim 16, wherein the object recognition weights shapes and patterns of the at least one of the one or more objects more heavily than colors of the at least one of the one or more objects.

18. The system of claim 15, wherein correcting the target image based on the one or more corrected objects comprises weighting a position of the one or more corrected objects to correct the target image.

19. The system of claim 15, wherein the non-transitory computer-readable medium further stores instructions that, when executed, cause the processor to generate an index of degradation based on how the one or more corrected objects are corrected.

20. The system of claim 19, wherein correcting the target image based on the one or more corrected objects comprises:

averaging the index of degradation for the one or more corrected objects; and correcting the target image based on an average of the index of degradation for the one or more corrected objects.

21. The system of claim 15, wherein the degraded target material comprises light information and the identified object is corrected based on the light information.

\* \* \* \* \*